May 6, 1958

J. SALAUZE 2,833,847

POSITIVE PLATE FOR BATTERIES

Filed July 9, 1954

Fig. 1.

- NICKEL-PLATED PERFORATED METALLIC SUPPORT
- POSITIVE ELECTRODE
- SINTERED COATING FORMED FROM A MIXTURE OF NICKEL AND SILVER POWDER

Fig. 2.

- NICKEL PLATED WIRE GRID SUPPORT
- NICKEL PLATED FRAME
- POSITIVE ELECTRODE
- SINTERED COATING FORMED FROM A MIXTURE OF NICKEL AND SILVER POWDER

Fig. 3.

- METALLIC SUPPORT
- NICKEL POWDER PARTICLE SKELETON
- SILVER POWDER PARTICLES

INVENTOR
Jean Salauze
BY
Kenyon & Kenyon
ATTORNEYS

United States Patent Office 2,833,847
Patented May 6, 1958

2,833,847

POSITIVE PLATE FOR BATTERIES

Jean Salauze, Paris, France, assignor to Societe des Accumulateurs Fixes et de Traction (Societe Anonyme), Romainville, Seine, France, a French company Application July 9, 1954, Serial No. 442,445

Claims priority, application France July 24, 1953

7 Claims. (Cl. 136—29)

Primary and secondary cells using silver as the active material at the positive electrode are already known in the art. When such electrodes are used in secondary cells, a gradual loss of their capacity, during the periods of charge and discharge, can be noted.

This early ageing of silver electrodes is probably due to the fact that, during the electrochemical reactions, the silver grains used in said electrodes agglomerate gradually together. The agglomerated masses become slowly impervious to the electrolyte.

An object of the invention is to construct a new type of silver electrode more able to retain its initial capacity, when in service.

A second object of the invention is to construct a new type of silver electrode having a greater efficiency.

Another object of the invention is to construct a new type of silver electrode provided with a highly electrically conductive metallic frame, in order that it may be able to deliver discharges at very high intensities, while there is no substantial reduction of the voltage.

In the accompanying drawing:

Fig. 1 is a partially broken-away elevational view of an electrode embodying the invention.

Fig. 2 is a similar view of a modified electrode also embodying the invention, and Fig. 3 is a diagrammatic illustration on an exaggerated scale of a cross-sectional view taken along line 3—3 of Fig. 1.

The electrode according to the invention is essentially composed of a sintered porous mass, said mass consisting in a mixture of nickel and silver grains, being an integral part of an electrically conductive metallic surface.

In such an electrode, the nickel grains which are superficially welded together by means of sintering, form a reticulated skeleton which encloses the silver grains, and at the same time divides and separates them, thus preventing their agglomeration during the electrochemical exchanges. Moreover, the sintering of the nickel grains results in welding the nickel skeleton onto the metallic frame. Said nickel skeleton, besides, gives a sufficient porosity which makes the electrochemical exchanges easier. Indeed experiment has shown that the efficiency of the silver present in such new types of plate is decidedly greater than in the plates known in the old art. Besides, the ageing of the silver grains is greatly reduced or even suppressed. Lastly, each grain of the active material has a good electrical connection with the corresponding terminal of the plate, said connection being established through the adjoining nickel powder and the metallic frame.

The powders which are used to produce the sintered porous mass are preferably as fine as possible, in order that each grain may have a very large surface in relation to its weight. Electrochemical exchanges are thus promoted to the utmost.

Nickel powder is preferably obtained through the thermal decomposition of nickel carbonyl. However, the invention is not to be construed as being limtied to this sole process, and nickel powder may be prepared through any other suitable process: for instance, through the reduction by hydrogen of a nickel oxide powder. More generally, I can use any metal substantially inalterable in the electrolyte, giving fine powders of light densities which can be sintered below 900° C. However, nickel is the preferred metal.

Silver powder may be obtained through the reduction of finely ground silver oxide, either by electrolysis of some silver salt, or by chemically displacing the silver of one of its salts by means of an electronegative metal such as zinc. Silver may also be used in the form of silver oxide powder which is prepared according to the usual processes. Silver oxide can be used because it is reduced to metal during the sintering operation.

The amount of silver (active metal) in the mixture is preferably higher than the amount of nickel (supporting metal). The amount of silver in weight may range from 60% to as high as 80% of the total weight of the powder.

The sintering of the mixture is best effected in a reducing atmosphere in order that the alteration of the metals may be avoided. I have discovered that the sintering temperature should not be too high because such a temperature promotes the agglomeration of the silver grains. On the other hand, if the temperature is too low, the nickel grains cannot be sintered together, which is necessary to establish a sufficient mechanical cohesion throughout the sintered mass. For these reasons the sintering operation must be effected at a temperature ranging between 700° C. and 900° C., and at preferably 800° C. The duration of the operation depends on the temperature adopted. It is about 30 minutes at the temperature of 800° C.

The highest porosity, of course, is obtained when the mixture to be sintered is not subjected to any compression. I have found that in such a case the cohesion of the produced plate is not very good. Both conditions of cohesion and porosity can be satisfied by subjecting the mixture, either before or during sintering, to a slight compression, for example, of approximately one kilogram per square centimetre of the surface; the sintering of the nickel particles is made easier in that way.

Example: One produces an intimate mixture of 70% of chemically prepared silver powder, passing through a screen—300 meshes per inch—and of 30% of nickel powder—0.9 density—derived from the decomposition of nickel carbonyl. The metallic support of the plate has interstices and is either a thin, largely perforated nickel plated sheet (for example 40% of perforations, with holes of 2 millimetres diameter) or a nickel plated steel frame unto which a grid of thin nickel plated steel or copper wire, having a mesh a few millimetres wide, is welded. The nickel-silver powders mixture is deposited in thin layers on either side of the support which is thus embedded in said mixture. The assembled plate is heated up for a period of 30 minutes, in a reducing atmosphere, at the temperature of 800° C. A test conducted in such way has given the following records:

Total weight of the plate: 120 grammes
Weight of the nickel-silver powder: 80 grammes
Amount of the silver being used: 56 grammes
Thickness of the plate being obtained: 2 millimetres
Sintering: 30 minutes at 800° C.
Theoretical capacity of the plate: 28 ampere-hours
Real capacity on the 2nd cycle: 25.5 ampere-hours
Real capacity on the 100th cycle: 24 ampere-hours The positive plates so prepared are used as positive electrodes in primary and secondary cells where they are associated with any negative electrode (iron, cadmium, zinc, magnesium) to be used in a cell in which the electrolyte is an aqueous solution of an alkaline hydroxide.

Of course, the invention is not to be construed as being limited to the sole process indicated above and given for illustrative purpose only.

What is claimed is:

1. A method of producing an electrode for use as a positive plate for a charged alkaline cell, comprising the steps of preparing a mixture by intimately mixing a finely divided nickel powder having a density of approximately 0.9 and a silver providing substance in the form of finely divided powder capable of passing an approximately 300 mesh/sq. in. screen, with the major portion by weight of the mixture being the silver providing substance, providing a supporting member having interstices, coating said mixture over and into the interstices of the supporting member and sintering the coated assembly.

2. A method of producing an electrode plate for use upon charging of an alkaline electrolyte cell as a positive electrode plate thereof comprising the steps of preparing an intimate mixture consisting of finely divided powdered nickel particles and finely divided powder particles of silver containing substance in the proportions of from 60%–80% by weight of silver and 40%–20% by weight of nickel, said powdered nickel particles having a density of approximately 0.9 and said powder particles of silver being capable of passing an approximately 300 mesh/sq. in. size screen, providing a metallic supporting member having interstices, applying the powder mixture to the supporting member so as to coat its surfaces and also to fill its interstices, applying pressure to the assembly of approximately one kilogram per square centimeter, and sintering the coated and compressed assembly in a reducing atmosphere at a temperature ranging from 700° C. to 900° C. to effect a welding together of particles of the nickel powder in the form of a reticulated skeleton in whose voids particles of silver are lodged and maintained in a divided condition by the skeleton thus preventing the agglomeration of the silver particles.

3. A method of producing an electrode plate for use upon the charging of an alkaline electrolyte cell as its positive plate comprising the steps of preparing an intimate mixture consisting of finely divided powdered nickel particles of approximately 0.9 density derived from the thermal decomposition of nickel carbonyl and of finely divided silver powder capable of passing approximately 300 mesh/sq. in. screen and derived by chemical displacement by zinc of silver from an aqueous solution of a silver salt and in which the weight of the silver powder ranges from approximately 60% up to 80% of the total weight of the powdered mixture, providing a metallic supporting member having interstices, applying the powder mixture to the supporting member so as to coat its surfaces and fill its interstices, applying mild compression of approximately one kilogram per square centimeter to the assembly, and sintering the assembly in a reducing atmosphere at a temperature ranging from 700° C. to 900° C. to effect the welding together of particles of the nickel powder in the form of a reticulated skeleton which is also welded to said support and in whose voids particles of silver are lodged and maintained in a divided condition by the nickel skeleton thus preventing agglomeration of the silver particles.

4. A method of producing an electrode plate for use upon charging of an alkaline electrolyte cell as its positive electrode comprising the steps of preparing an intimate mixture consisting of finely divided powdered nickel particles of approximately 0.9 density and derived from the thermal decomposition of nickel carbonyl and of finely divided silver oxide powder capable of passing approximately 300 mesh/sq. in. screen and in which the weight of the silver oxide powder ranges from approximately 60% up to 80% of the total weight of the powdered mixture, providing a metallic supporting member having interstices, applying the powder mixture to the supporting member so as to coat its surfaces and fill its interstices, applying mild compression of approximately one kilogram/square centimeter to the assembly and sintering the coated assembly in a reducing atmosphere at a temperature ranging from 700° C. to 900° C. to effect the welding together of particles of the nickel powder in the form of a skeleton which is also welded to said support and in whose voids particles of silver are lodged and maintained in a divided condition by the nickel skeleton thus preventing agglomeration of the silver particles.

5. As an article of manufacture an electrode plate prepared according to the process of claim 2.

6. As an article of manufacture an electrode plate prepared according to the process of claim 3.

7. As an article of manufacture an electrode plate prepared according to the process of claim 4.

References Cited in the file of this patent

UNITED STATES PATENTS

| | | |
|---|---|---|
| 2,561,943 | Moulton et al. | July 24, 1951 |
| 2,700,693 | Fischback | Jan. 25, 1955 |
| 2,724,733 | Hagspihl et al. | Nov. 22, 1955 |
| 2,737,541 | Coolidge | Mar. 6, 1956 |

FOREIGN PATENTS

| | | |
|---|---|---|
| 27,861 | Great Britain | Mar. 23, 1905 |